C. A. PFANSTIEHL.
GAS DRIER.
APPLICATION FILED JULY 24, 1916.
1,281,064.
Patented Oct. 8, 1918.
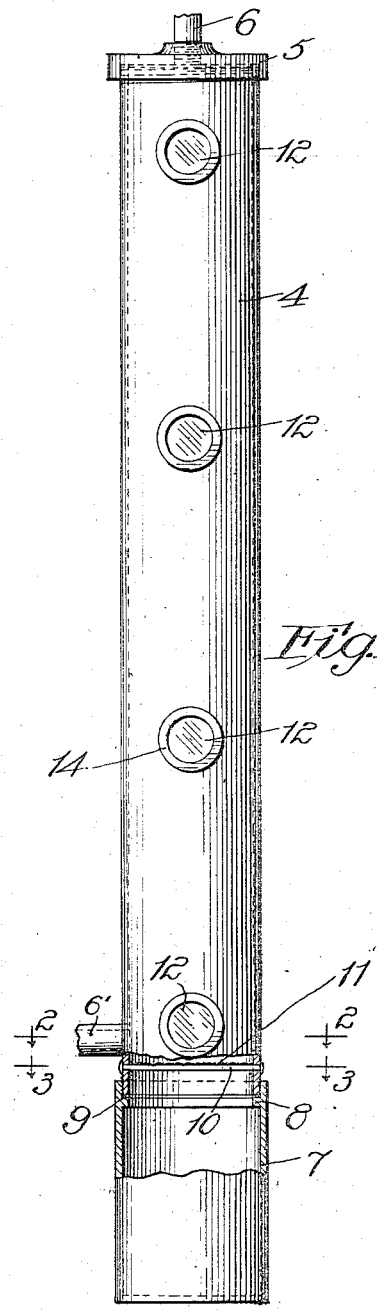
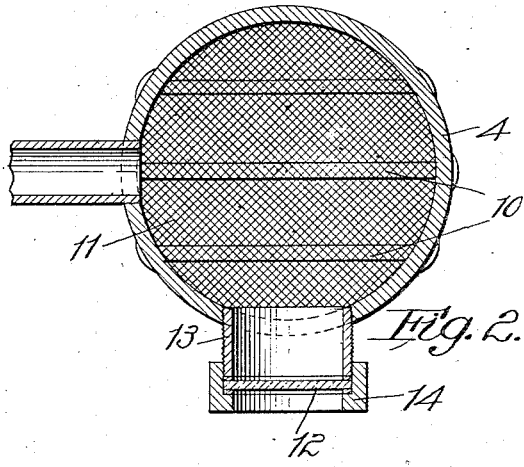
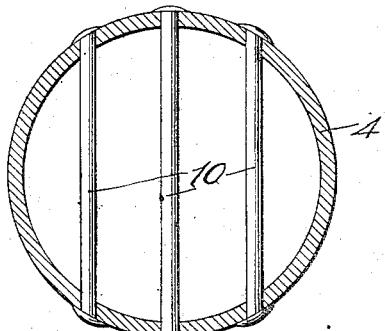
Witnesses:
Albin C. Ahlberg.
Robert F. Bracke
Inventor
Carl A. Pfanstiehl
By William Bradbury Lee
Attorneys

UNITED STATES PATENT OFFICE.

CARL A. PFANSTIEHL, OF HIGHLAND PARK, ILLINOIS, ASSIGNOR TO PFANSTIEHL COMPANY, INC., OF NORTH CHICAGO, ILLINOIS, A CORPORATION OF NEW YORK.

GAS-DRIER.

1,281,064.    Specification of Letters Patent.    Patented Oct. 8, 1918.

Application filed July 24, 1916. Serial No. 111,050.

*To all whom it may concern:*

Be it known that I, CARL A. PFANSTIEHL, a citizen of the United States, residing at Highland Park, in the county of Lake and State of Illinois, have invented a certain new and useful Improvement in Gas-Driers, of which the following is a full, clear, concise, and exact description, reference being had to the accompanying drawings, forming a part of this specification.

My invention relates to hydrogen gas drying apparatus and comprises a long and slender tank arranged vertically and adapted to have hydrogen gas passed through it from the base upward. The object of my invention is to provide a tank which shall be economical in its operation and one which shall be of sufficient size and convenient form for drying hydrogen in large quantities, and which is circulated at a high speed and under a considerable pressure.

My invention is illustrated in the accompanying drawings in which,

Figure 1 is an elevation;

Fig. 2 is a section on the line 2—2 of Fig. 1; and

Fig. 3 is a section on the line 3—3 of Fig. 1.

Tanks of this character are used for drying hydrogen in large quantities when used in a continuous circulating system for reducing tungsten trioxid to metallic tungsten powder. It has been found that by maintaining a high velocity of hydrogen over the tungsten trioxid powder in a reducing furnace the reduction takes place in much shorter time and with more even results than if the hydrogen is brought into contact with the powder with an insufficient velocity to carry off all of the moisture produced by the reduction before it has had an opportunity to again unite with the heated tungsten. The hydrogen drying tanks of the prior art, so far as I am aware, were designed to dry hydrogen only in comparatively slowly moving quantities and were not, as is my invention, arranged for economically drying large quantities of hydrogen gas in an efficient manner and without frequently changing the contents of the drying tank.

The tank of my invention is about three feet in length, is preferably made of iron pipe, and is provided with observation windows and also with a detachable metal well for collecting the moisture. The tube 4 has threaded upper and lower ends, the upper end being provided with a cap 5 into which extends the hydrogen egress pipe 6 connected with suitable couplings, not shown, to the hydrogen circulating system. The cup or well 7 is threaded into the lower end of the pipe and is provided with a shoulder 8 for the abutment of a gasket 9 which serves to prevent the leakage of gas, which is preferably circulated under pressure. Near the bottom of the tube 4 is a suitable hydrogen ingress tube 6' below which is a series of cross wires 10 which supports a screen 11 the purpose of which is to prevent the calcium chlorid from falling into the liquid well before it has become thoroughly dissolved. At several points throughout the length of the tank observation windows 12 are provided, these being mounted on the ends of short projecting tubes 13, the inner ends of which are threaded into the main drier tube 4. A cap 14 holds the observation glass into firm contact with the gaskets 15 and 16 by means of which the escape of gas around the window 12 is prevented.

In the operation of the device the tube is filled from screen to top with lumps of dehydrated calcium chlorid, phosphorous pentoxid, or other deliquescent material. As the moist hydrogen passes into the tube through the ingress pipe 6' that portion of the calcium chlorid nearest this pipe is first dissolved by the moisture carried by the gas. As the gas passes upward through the tube further traces of moisture are gradually extracted until the gas passing through the egress tube 6 is relieved of the greater portion of its moisture. For the purpose of drying hydrogen for the reduction of tungsten I have found it preferable to pass this gas serially through two or more tanks such as herein described, though I have found that the quantity of moisture collected in other than the first of these tanks is so small that the tanks may be run for months without the necessity of refilling.

As the calcium chlorid becomes dissolved in the water the solution trickles through the screen at the base of the tank and drips into the well 7. Inasmuch as the moisture runs down the tank by gravity and inasmuch as the moist gas is passing in the opposite direction and, therefore, in its most moistened condition comes into contact with the calcium chlorid at the base of the tank first, I find that the calcium chlorid disappears from the tank by the absorption of moisture almost entirely from the bottom. When the tank is first filled the calcium chlorid can be seen at each of the observation windows. After the tank has been operated for a sufficient length of time the calcium chlorid can no longer be seen through the lower window. After a few hours of operation the calcium chlorid can no longer be seen through the second window from the bottom. In this manner the calcium chlorid forms a dome of moist material which apparently supports the drier calcium chlorid above, the whole mass being gradually dissolved from the bottom until the space below the calcium chlorid extends the full height of the tank, or rather until it extends to a point opposite the uppermost window.

The size of the calcium chlorid drier has been so calculated that the first tank in the series of four must be refilled once for each day's drying operation and the well is made of such size as to hold that quantity of calcium chlorid in concentrated solution which filled the entire tank when in the form of loosely packed lumps. In order to refill the tank the cap 5 is removed, the small dome of calcium chlorid remaining at the top is broken down, and sufficient crystals poured in on top to completely refill the tube.

What I claim as new and desire to secure by Letters Patent of the United States is:

1. A calcium chlorid drier for circulating gases comprising a long and slender iron tube having observation windows, one at the bottom and another at the top, a gas ingress pipe near the bottom window, said tube being provided with a removable drip pan or well wholly below the gas ingress pipe.

2. A calcium chlorid drier for circulating gases comprising a long and slender vertical metal tube having a perforate partition near the bottom thereof for supporting crystals of calcium chlorid, and a well detachably secured to the base of the tube and adapted to be bodily removed without disturbing the calcium chlorid within the tube.

3. A chemical drier for circulating gases comprising a long and slender vertically mounted metal tube having a plurality of observation windows therein for observing the condition of the drying chemical, a gas ingress pipe near the bottom of the tube, and a gas egress pipe near the top thereof, and a well detachably secured to the base of the tube for collecting the dissolved drying chemical.

In witness whereof, I hereunto subscribe my name this 21st day of July, A. D., 1916.

CARL A. PFANSTIEHL.

Witnesses:
E. M. CONRAD,
C. C. SANBORN.